United States Patent
Hann, Jr. et al.

(10) Patent No.: US 6,724,404 B1
(45) Date of Patent: Apr. 20, 2004

(54) CLUSTER TOOL REPORTING SYSTEM

(75) Inventors: Thomas C. Hann, Jr., Colorado Springs, CO (US); Mark D. Meyer, Vancouver, WA (US); Theodore O. Meyer, Gresham, OR (US)

(73) Assignee: LSI Logic Corporation, Milpitas, CA (US)

( * ) Notice: Subject to any disclaimer, the term of this patent is extended or adjusted under 35 U.S.C. 154(b) by 677 days.

(21) Appl. No.: 09/777,996

(22) Filed: Feb. 6, 2001

(51) Int. Cl.$^7$ .................................................. G09G 5/00
(52) U.S. Cl. ........................ 345/771; 345/772; 700/108; 700/159
(58) Field of Search .............................. 700/12, 19, 95, 700/108, 109, 110, 121, 159, 160, 169, 170, 174, 175, 176, 177, 178, 179, 180, 181, 182; 345/771, 772; 438/785, 243, 386, 396, 397, 398, 399

(56) References Cited

U.S. PATENT DOCUMENTS

| | | | | |
|---|---|---|---|---|
| 5,914,879 A | * | 6/1999 | Wang et al. ................ | 700/111 |
| 2002/0116083 A1 | * | 8/2002 | Schulze ...................... | 700/108 |

* cited by examiner

*Primary Examiner*—Ba Huynh
(74) *Attorney, Agent, or Firm*—Luedeka, Neely & Graham

(57) ABSTRACT

A method for determining an up time of a multi-component tool having discrete elements, where the up time determination is based upon different processes that are to be accomplished in the multi-component tool. The discrete elements of the multi-component tool and the different processes to be accomplished in the multi-component tool are identified. Different tool states for the multi-component tool are determined by setting element states for each of the discrete elements of the multi-component tool. A first possible element state indicates that the discrete element is functional, and a second possible element state indicates that the discrete element is nonfunctional. Possible combinations of the element states of the discrete elements are identified as the different tool states of the multi-component tool. A determination is made as to which of the different processes can be accomplished in the different tool states, and a percentage of time usage is determined for the allocation of the multi-component tool to each of the different processes. Rates associated with combinations of the different tool states with the different processes are determined. Process state efficiencies are determined from the rates and the percent of time usage allocated to the processes associated with the rates. A preliminary state efficiency for the different tool states is determined from the process state efficiencies associated with the different tool states. Percent of time conditions are determined for the different tool states, where the percent of time conditions represent ratios of time that the multi-component tool exhibits the associated tool state. The final state efficiencies for the different tool states are determined from the percent of time conditions and the preliminary state efficiencies associated with the different tool states, and the up time is determined from the final state efficiencies.

20 Claims, 4 Drawing Sheets

10A

| State | MET16602 | MET16602-LPTA | MET16602-LPTB | MET16602-LLA | MET16602-LLB | MET16602-CH-C | MET16602-CH-D | MET16602-CH1 | MET16602-CH-2 | MET16602-CH4 | bin arycode |
|---|---|---|---|---|---|---|---|---|---|---|---|
| 156 | 1 | 0 | 1 | 0 | 0 | 1 | 1 | 1 | 1 | 0 | 1010011110 |
| 157 | 1 | 0 | 1 | 0 | 0 | 1 | 1 | 1 | 1 | 1 | 1010011111 |
| 158 | 1 | 0 | 1 | 0 | 1 | 0 | 0 | 1 | 0 | 0 | 1010100000 |
| 159 | 1 | 0 | 1 | 0 | 1 | 0 | 0 | 0 | 0 | 1 | 1010100001 |
| 160 | 1 | 0 | 1 | 0 | 1 | 0 | 0 | 0 | 1 | 0 | 1010100010 |
| 161 | 1 | 0 | 1 | 0 | 1 | 0 | 0 | 0 | 1 | 1 | 1010100011 |
| 162 | 1 | 0 | 1 | 0 | 1 | 0 | 0 | 1 | 0 | 0 | 1010100100 |
| 163 | 1 | 0 | 1 | 0 | 1 | 0 | 0 | 1 | 0 | 1 | 1010100101 |
| 164 | 1 | 0 | 1 | 0 | 1 | 0 | 1 | 1 | 1 | 0 | 1010100110 |
| 165 | 1 | 0 | 1 | 0 | 1 | 0 | 1 | 0 | 1 | 1 | 1010100111 |
| 166 | 1 | 0 | 1 | 0 | 1 | 0 | 1 | 0 | 0 | 0 | 1010101000 |
| 167 | 1 | 0 | 1 | 0 | 1 | 0 | 1 | 0 | 0 | 1 | 1010101001 |
| 168 | 1 | 0 | 1 | 0 | 1 | 0 | 1 | 0 | 1 | 0 | 1010101010 |
| 169 | 1 | 0 | 1 | 0 | 1 | 0 | 1 | 0 | 0 | 1 | 1010101011 |
| 170 | 1 | 0 | 1 | 0 | 1 | 0 | 1 | 1 | 0 | 0 | 1010101100 |
| 171 | 1 | 0 | 1 | 0 | 1 | 0 | 1 | 1 | 0 | 1 | 1010101101 |
| 172 | 1 | 0 | 1 | 0 | 1 | 0 | 1 | 1 | 1 | 0 | 1010101110 |
| 173 | 1 | 0 | 1 | 0 | 1 | 0 | 1 | 1 | 1 | 1 | 1010101111 |
| 174 | 1 | 0 | 1 | 0 | 1 | 1 | 0 | 0 | 0 | 0 | 1010110000 |

Fig. 1

| Salicide | | | | | TTN1-DEP | | | | | TTN2,3,4,5-DEP | | | | | Overall Efficiency |
|---|---|---|---|---|---|---|---|---|---|---|---|---|---|---|---|
| | % Time | Capability | Rate | Efficiency | | % Time | Capability | Rate | Efficiency | | % Time | Capability | Rate | Efficiency | |
| CC9SAL | 33.33% | 0 | 0% | 0.00% | | 33.33% | 0 | 0% | 0.00% | | 33.33% | 0 | 0% | 0.00% | 0% |
| C10SAL | 33.33% | 0 | 0% | 0.00% | | 33.33% | 0 | 0% | 0.00% | | 33.33% | 0 | 0% | 0.00% | 0% |
| C11SAL | 33.33% | 0 | 0% | 0.00% | | 33.33% | 0 | 0% | 0.00% | | 33.33% | 0 | 0% | 0.00% | 0% |
| C1PSAL | 33.33% | 0 | 0% | 0.00% | | 33.33% | 0 | 0% | 0.00% | | 33.33% | 0 | 0% | 0.00% | 0% |
| C12SAL | 33.33% | 0 | 0% | 0.00% | | 33.33% | 0 | 0% | 0.00% | | 33.33% | 0 | 0% | 0.00% | 0% |
| | 33.33% | 0 | 0% | 0.00% | | 33.33% | 0 | 0% | 0.00% | | 33.33% | 0 | 0% | 0.00% | 0% |
| | 33.33% | 0 | 0% | 0.00% | | 33.33% | 1 | 95% | 31.66% | | 33.33% | 0 | 0% | 0.00% | 32% |
| | 33.33% | 1 | 95% | 31.66% | | 33.33% | 1 | 95% | 31.66% | | 33.33% | 0 | 0% | 0.00% | 63% |
| | 33.33% | 0 | 0% | 0.00% | | 33.33% | 0 | 0% | 0.00% | | 33.33% | 0 | 0% | 0.00% | 0% |
| | 33.33% | 0 | 0% | 0.00% | | 33.33% | 0 | 0% | 0.00% | | 33.33% | 0 | 0% | 0.00% | 0% |
| | 33.33% | 0 | 0% | 0.00% | | 33.33% | 0 | 0% | 0.00% | | 33.33% | 0 | 0% | 0.00% | 0% |
| | 33.33% | 1 | 95% | 31.66% | | 33.33% | 1 | 95% | 31.66% | | 33.33% | 1 | 50% | 16.67% | 48% |
| | 33.33% | 1 | 95% | 31.66% | | 33.33% | 0 | 0% | 0.00% | | 33.33% | 0 | 0% | 0.00% | 32% |
| | 33.33% | 0 | 0% | 0.00% | | 33.33% | 1 | 95% | 31.66% | | 33.33% | 1 | 50% | 16.67% | 80% |
| | 33.33% | 0 | 0% | 0.00% | | 33.33% | 0 | 0% | 0.00% | | 33.33% | 0 | 0% | 0.00% | 0% |

Fig. 2

CLUSTER TOOL REPORTING SYSTEM

FIELD

This invention relates to the field of microelectronic circuit production equipment up time determination. More particularly the invention relates to a system for determining the actual up time of a cluster tool.

BACKGROUND

For a variety of different reasons, cluster tools are increasingly used in the production of microelectronic circuits, such as semiconductor devices. A cluster tool, in its basic implementation, is typically comprised of more than one processing chamber, each of which is connected to a common transfer chamber, which in turn is connected to one or more common loading stations. Therefore, the use of cluster tools tends to increase the rate at which production pieces are processed through the processing chambers, and also tends to increase the ratio of production rate per fabrication facility size.

The pieces to be processed in the cluster tool, typically semiconductor substrates, are staged in the loading station by an operator and brought into the common transfer chamber under the programmable control of the cluster tool. The common transfer chamber is typically environmentally controlled in some manner. For example, the common transfer chamber may be kept at a reduced pressure, a low moisture content, a low oxygen content, or under the environment of a specific gas.

The substrates are processed through one or more of the different processing chambers in a selection and order determined by the cluster tool, as programmed to achieve a specific outcome. For example, one program may be set up to create a metal layer stack, with several different metal layers deposited in different ones of the processing chambers, followed by an anneal in another of the processing chambers. Other metallization systems may make use of a different set of the processing chambers in which metal layers are deposited, or use the processing chambers in a different order.

Thus, a cluster tool can be thought of as a system comprised of several discrete but often interdependent processing chambers. When the substrates have completed processing, they are typically automatically removed from the common transfer chamber and returned to the common loading station, to be taken to another processing location.

In most processing environments it is generally regarded as beneficial to be able to determine the amount of time that a particular piece of processing equipment is available for production. Because a cluster tool has several different components, it presents some rather unique challenges when determining the up time for the cluster tool. For example, because the different components tend to be interrelated, and also because the different components are typically used at different times in different orders and groupings, traditional methods of up time determination tend to be inadequate.

What is needed, therefore, is a system for determining the up time of a cluster tool.

SUMMARY

The above and other needs are met by a method for determining an up time of a multi-component tool having discrete elements, where the up time determination is based upon different processes that are to be accomplished in the multi-component tool. The discrete elements of the multi-component tool and the different processes to be accomplished in the multi-component tool are identified. Different tool states for the multi-component tool are determined by setting element states for each of the discrete elements of the multi-component tool. A first possible element state indicates that the discrete element is functional, and a second possible element state indicates that the discrete element is nonfunctional. Possible combinations of the element states of the discrete elements are identified as the different tool states of the multi-component tool.

A determination is made as to which of the different processes can be accomplished in the different tool states, and a percentage of time usage is determined for the allocation of the multi-component tool to each of the different processes. Rates associated with combinations of the different tool states with the different processes are determined. Process state efficiencies are determined from the rates and the percent of time usage allocated to the processes associated with the rates. A preliminary state efficiency for the different tool states is determined from the process state efficiencies associated with the different tool states. Percent of time conditions are determined for the different tool states, where the percent of time conditions represent ratios of time that the multi-component tool exhibits the associated tool state. The final state efficiencies for the different tool states are determined from the percent of time conditions and the preliminary state efficiencies associated with the different tool states, and the up time is determined from the final state efficiencies.

By taking into account the various states of the multi-component tool and the various factors associated with running the different processes on the multi-component tool in these various states, the method as described above provides a real world determination of the up time for a multi-component tool, such as a cluster tool. Other methods, such as serially multiplying the individual up times for each of the discrete element, or looking at the discrete elements in parallel to determine whether any process can possibly be run in the multi-component tool, tend to either under estimate or over estimate respectively the actual up time of the multi-component tool, as based upon the processes that are actually schedule to run in the multi-component tool.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 1 is a first part of an equipment matrix,

FIG. 2 is a second part of the equipment matrix,

DETAILED DESCRIPTION

As described in greater detail below, the present invention can be manifest in several different embodiments, such as a method to be followed, a computer program, and a computerized system. Rather than describing each of these different embodiments separately, the discussion below uses the framework of the method to present and organize the detailed description of the embodiments, with the descriptions of the various different aspects of the different embodiments interwoven at appropriate points as needed within the description of the method.

Figure 4:
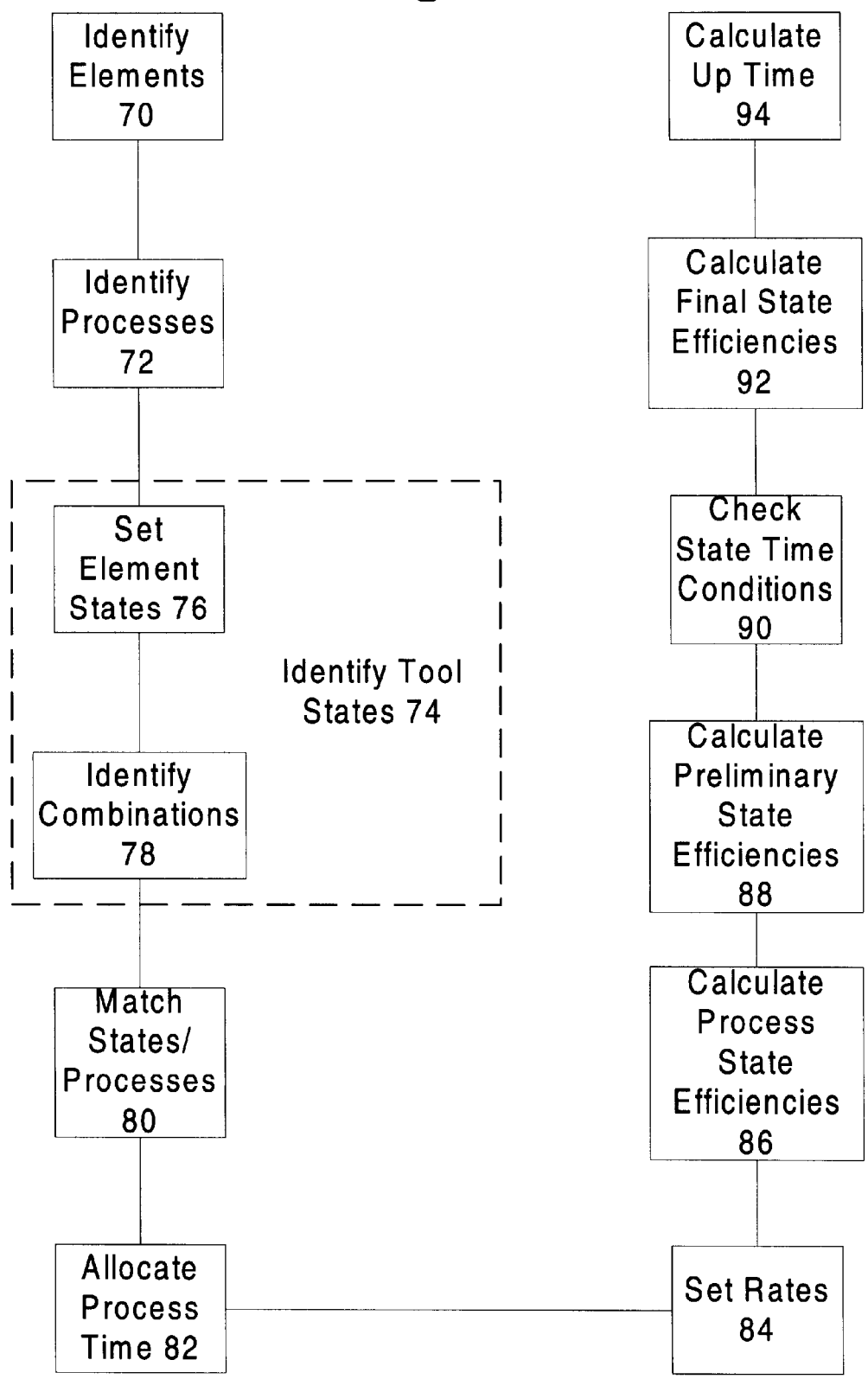
FIG. 4 is a flow chart for a method according to the invention.

FIG. 4 presents a flow chart of a method according to the present invention. The first step of the method as depicted in FIG. 4 is to identify the various elements of the multi-component tool, as in step 70. In the specific example of a cluster tool, as described above, there are typically several elements which comprise the cluster tool.

For example, the controller for the cluster tool may be considered as one element of the cluster tool. As previously mentioned, there may also be one or more common loading points where the work pieces, typically wafers, are staged for processing into and out of the cluster tool. Each of these loading points are preferably considered as separate elements. Further, the loading points of a cluster tool are typically serviced by load locks to protect the environment within the cluster tool. The load locks are also preferably considered as separate elements. Each of the processing chambers within the cluster tool are also preferably considered to be separate elements.

Figure 3:
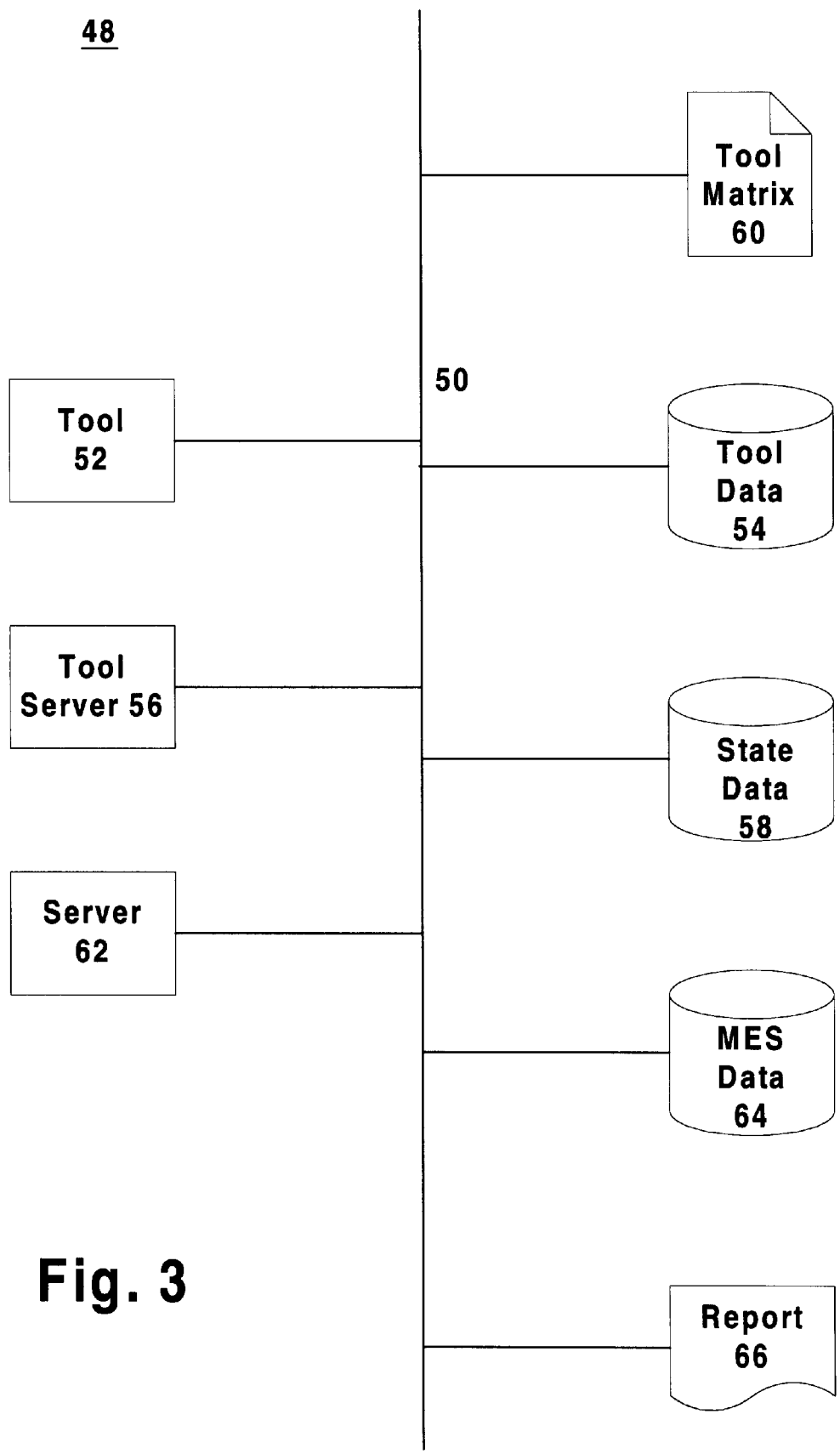
FIG. 3 is a functional block diagram of a system according to the invention.

FIG. 3 presents a functional block diagram of a computer based system 48 according to the present invention. The multi-component tool 52 does not show the various elements as described above, because the invention is not limited either to this number of elements or to these types of elements. However, it is understood that the multi-component tool 52 may represent one or more pieces of equipment such as a cluster tool, having these elements as described above.

FIG. 1 depicts a first portion 10A of an equipment matrix for the multi-component tool 52. In the top row of the columns 14, 16, 18, 20, 22, 24, 26, 28, 30, and 32 are listed identifiers for the various different elements of the multi-component tool 52 that were identified in step 70 of the method. The identifiers used in this example are not critical as to form, as their function is to merely identify the various elements in a manner that is helpful to the user of the system, according to whatever criteria may exist for making such a determination at the time.

Within the first row of the matrix of FIG. 1, column 14 identifies the main body of the multi-component tool 52 itself, which may also be thought of as the controller, or the portions of the multi-component tool 52 which hold all of the other separately identified elements together, and which are not specific enough or critical enough in purpose or function to warrant identification as separate elements, or which are so highly integrated in construction or purpose as to resist identification as separate elements. The identifier selected for the main body of the multi-component tool 52 is, in this example, added as a prefix to all of the other identifiers selected for the other elements of the multi-component tool 52.

Column 16 identifies a first load point, load point A, of the multi-component tool 52. Similarly, column 18 identifies a second load point, load point B, of the multi-component tool 52. Columns 20 and 22 identify first and second load locks, load lock A and load lock B, which are associated respectively with the first and second load points of the multi-component tool 52. Columns 24, 26, 28, 30, and 32 represent five separate processing chambers within the multi-component tool 52. Although the specific nature of the processes to be accomplished in these chambers is not essential to a thorough description or understanding of the present invention, it is used as a further example below that these chambers function to form multi-layer metallic-based thin films for semiconductor devices. It is appreciated, however, that the invention is equally applicable to multi-component tools 52 that provide different processes and functions. The chambers may or may not provide similar processing.

The first portion 10A of the tool matrix is depicted in FIG. 3 as tool matrix 60, which is a component of the computerized system 48. As depicted in FIG. 3, both the tool matrix 60 and the multi-component tool 52 are connected via a computerized network system 50. The computerized network system 50 is highly representational in FIG. 3. For example, the lines of the computerized network system 50 as depicted represent the ability to communicate between different elements of the computerized system 48. However, there may be no need to communicate between sets of two or more of some of the elements of the computerized system 48. Further, rather than being a single united computerized network system 50, the computerized network system 50 may be several different communication systems that exist specifically between the sets of the various elements which have a need to communicate one with another, as described in greater detail below.

Further, it is appreciated that the various elements as depicted in FIG. 3 are functional representations and not necessarily physical representations. In other words, each of the various elements as depicted in FIG. 3 may, in a first embodiment, exist as separate and discrete physical elements. However, in a second embodiment, all of the various elements as depicted in FIG. 3 may physically reside within the multi-component tool 52, for example, or within the physical embodiment of one of the other functional elements. Alternately, the various elements as depicted in FIG. 3 may physically reside within an intermediate number of physical elements. For example, all of the storage elements, as further described below, may reside within a single a drive, or sets of drives, in a single server. Further, the different servers may be separate servers or the same server that performs multiple functions, or may alternately be computing capacity that exists within the multi-component tool 52 or other elements of the computerized system 48. Thus, the invention is not to be limited physically to the specific functional example as depicted in FIG. 3.

The second step 72 listed in the example of the method as depicted in FIG. 4 is to identify the processes that are to be accomplished on the multi-component tool 52. For the sake of example, these processes are identified in a second portion 10B of the tool matrix 60, as depicted in blocks 34A, 34B, and 34C of FIG. 2. Block 34A represents a salicide process to be accomplished using a certain process flow through the various elements of the multi-component tool 52. Similarly, block 34B represents a first titanium and titanium nitride deposition process, and block 34C represents a second titanium and titanium nitride deposition process, both of which are also to be accomplished using certain process flows through the various elements of the multi-component tool 52. As mentioned above, these specific processes are given by way of example only, and the invention is not to be limited to these specific processes in any way.

The set of steps next depicted in FIG. 4 have as a purpose to identify different tool states, as indicated in block 74 of FIG. 4. By tool states it is meant the different conditions of operability in which the multi-component tool 52 can exist. In this example, the first step of this process is given in block 76 as setting element states. For most elements of the multi-component tool 52 there are only two states that are required, a first state that indicates that the discrete element is functional and a second state that indicates that the discrete element is nonfunctional. However, it is possible for some elements to have a third or further additional states, which may indicate, for example, that the discrete element is functional for certain processes but not for others.

For various reasons, the states are preferably represented as a 0 and a 1, where 0 indicates that the element is nonfunctional and 1 indicates that the element is functional. Thus, as depicted in the first portion 10A of the tool matrix 60 in FIG. 1, the columns 14–32 contain notations of 0's and 1's, representing respectively nonfunctional and functional states for the specific element associated with the column. For the purposes of an explanation of the present invention, it is not important to know the reason why a given element may be nonfunctional.

The second step listed as a part of identifying the tool states 74 in the example depicted in FIG. 4 is to identify combinations of the element states of the discrete elements as the different tool states of the multi-component tool 52. The first portion 10A of the tool matrix 60 as depicted in FIG. 1 presents a few of these combinations. As depicted, each of the rows of the tool matrix 60 presents a unique combination of the different element states of the elements of the multi-component tool 52. Column 12 assigns a numerical identifier to the tool state represented by each row of combined element states. For example, the tool state identified as 156 in column 12 contains a unique combination of element states as indicated by reading across the row 156 and reading the element state listed for each of the elements. In this example, tool state 156 represents elements that are, in order, functional, nonfunctional, functional, nonfunctional, nonfunctional, functional, functional, functional, functional, and nonfunctional.

Thus, in tool state 156, in this example as introduced above, the main body of the cluster tool is functional as represented in column 14, but the first load point represented in column 16 is nonfunctional, as is the first load lock associated with the first load point, which is represented in column 20. The second load point as represented in column 18 is functional, but the second load lock associated with it as represented in column 22 is nonfunctional. Similarly, all of the processing chambers represented in columns 24–30 are functional, but the processing chamber represented in column 32 is nonfunctional. Thus, this unique combination of the discrete element states represents a single tool state for the multi-component tool 52. FIG. 1 depicts several other tool states in addition to tool state 156, which additional tool states are listed in the rows below that for tool state 156.

By representing the functional and nonfunctional element states as 0's and 1's, the strings of 0's and 1's can be combined into a binary word which represents the tool state, which binary word is given in column 34. To continue the example of tool state 156 as introduced above, it is seen that the binary word contained in column 34 for tool state 156 is taken by placing all of the representations of the element states together into a single numeric string. Thus, the binary code for the tool state makes the tool state easier to communicate. the binary code for the tool state preferably has a length, or in other words a number of bits, that is equal to the number of separate elements identified for the multi-component tool 52.

In the present example, the number of separate elements identified for the multi-component tool 52 is ten. Thus the binary code for each tool state has a length of ten bits. From this it readily follows that the number of different possible tool states is $2^{10}$, which is the number two raised to a power equal to the number of discrete elements identified, and which in this case ranges from 0000000000 to 1111111111, for a total of 1,024 different tool states. The binary code for tool state 156 is 1010011110, which represents the element states as described above in more detail.

It is impractical and unnecessary to list all of these different possible tool states herein, as an understanding of the invention can be conveyed without such. Further, it may not even be necessary to enumerate all such in the tool matrix 60. For example, some of the discrete elements of the multi-component tool 52 may be interdependent to the point that if one is nonfunctional, then a given process cannot be accomplished regardless of whether another of the discrete elements is functional or nonfunctional. For example, if a load point is nonfunctional, it may not make any difference whether its associated load lock is functional or nonfunctional, as the load lock may only be able to work in combination with its associated load point. Thus, while it may be preferable to list these two elements as separate elements so that a record can be more readily kept as to when each is functional or nonfunctional, it may not be necessary to specifically enumerate as different tool states in the tool matrix 60 all possible combinations that include one or both of these discrete elements being nonfunctional.

The tool state is preferably communicated by the multi-component tool 52 across the computerized network to a state database 58. The state database 58 preferably contains a record of when a state for each of the elements of the multi-component tool 52 changes. In this manner, a tool server 56 is able to preferably determine which tool state the multi-component tool 52 is in, using the historical records of element state changes as recorded in the state database 58, and preferably record the tool state of the multi-component tool 52 in the state database 58 as a function of time. Thus, the different tool states that the multi-component tool 52 has been in, and the length of time in which the multi-component tool 52 has been in each tool state is preferably recorded by the tool server 56 in the state database 58. The desirability of this functionality is described in greater detail at a later point in this description.

The next step given in the example depicted in the method of FIG. 4 is to match the identified states with the various processes, as given in block 80. In other words, the purpose of this step is to determine which of the different processes can be accomplished in the different tool states. This is represented in columns 38A, 38B, and 38C of the second portion 10B of the tool matrix 60 as depicted in FIG. 2. If a process is capable in a given tool state, or in other words if it is possible to accomplish a certain process when the multi-component tool 52 is in a given tool state, then a 1 is preferably placed in the matrix 60. If a process is not capable in a given tool state, or in other words if it is not possible to accomplish a certain process when the multi-component tool 52 is in a given tool state, then a 0 is preferably placed in the matrix 60. It is appreciated that different designations besides 0 and 1 could also be used. However, it is further appreciated that, when implemented in digital computing systems, the designations of 0 and 1 have great efficiency and versatility, and thus tend to be preferred for such designations.

As can be seen from an inspection of FIG. 2, some of the processes 34A, 34B, and 34C are capable in some of the tool states listed, and some of the processes 34A, 34B, and 34C are not capable in some of the tool states listed. Further, none of the processes 34A, 34B, and 34C are capable in some of the tool states listed, and all of the processes 34A, 34B, and 34C are capable in others of the tool states listed. The reason for this, as introduced above, is that there are some combinations of element states that will prevent any process from running in the multi-component tool 52.

Further, there are other elements that, when nonfunctional, may only reduce the efficiency of running certain processes within the multi-component tool 52, but do not prevent the processes from running at a reduced efficiency. As mentioned briefly above, some of these tool states may be grouped into a common tool state designation, where every tool state within the common tool state designation has a similar impact on the capability of the processes to be run in the multi-component tool 52, and on the efficiency of the processes to be run in the multi-component tool 52, as described in more detail below.

The next step given in the example depicted in the method of FIG. 4 is to allocate a process time, as given in block 82, or in other words determining a percent of time usage of the multi-component tool 52 that is allocated to each of the different processes. Thus, if there are three processes 34A, 34B, and 34C that are each run on the multi-component tool 52, such as given in the example depicted in FIG. 2, and if the utilization of the multi-component tool 52 is evenly divided between each of these three process 34A, 34B, and 34C, then the percent of time usage for each of the three process 34A, 34B, and 34C is one third, or 33.33%, as given in columns 36A, 36B, and 36C. If the utilization of the multi-component tool 52 was divided in another way between the processes to be accomplished on the multi-component tool 52, then the percent of time usage designated for each of the processes would be altered to reflect that alternate utilization.

The information from which the utilization of the multi-component tool 52 between the different processes is determined is preferably contained in a manufacturing execution system (MES) database 64. The manufacturing execution system database 64 preferably contains information in regard to the type of pieces that are scheduled for processing through the multi-component tool 52, and which have been processed through the multi-component tool 52, and which of the processes in the multi-component tool 52 have been utilized. Thus, the percent of time usage for the various processes can be computed from the data in the manufacturing execution system database 64. As mentioned above, it is appreciated that this information, as with the information described herein, may be found in alternate locations, and the designation of a separate database and the name of the database is a functional representation of one possible physical embodiment of the system.

It is also appreciated that the steps of the method according to the invention as described herein are not necessarily accomplished in the order described. For example, there is no particular reason why the step of determining which of the different processes can be accomplished in the different tool states, as given in block 80, must be accomplished prior to the step of determining a percent of time usage of the multi-component tool 52 that is allocated to each of the different processes, as given in block 82. Similarly, others of the different steps as described herein do not necessarily need to be accomplished in the order in which they are presented in this discussion.

The next step given in the example depicted in the method of FIG. 4 is to set rates for the processes, as given in block 84, or in other words to determine the rates associated with combinations of the different tool states with the different processes. This is preferably done empirically, by actually running the multi-component tool 52 in different tool states and determining the impact which the tool state has on the operation of the process in the multi-component tool 52. Alternately, this rate can be determined in a more logical fashion.

For example, for many of the tool states it will be readily understood that the process cannot be accomplished at all, and that the rate for the process associated with the tool state is zero percent. As depicted in FIG. 2, the process rate associated with many of the tool states depicted is zero percent, as given in columns 40A, 40B, and 40C. Logically, those processes that are not capable in a given tool state have a rate of zero in that tool state. Further, it can be also readily determined, for example, that the loss of one of two redundant elements that operate in parallel may reduce the rate by fifty percent. Thus, it may not be essential to empirically determine each of the process rates for each of the tool states.

The next step given in the example depicted in the method of FIG. 4 is to calculate process state efficiencies, as given in block 86, or in other words to determine process state efficiencies from the rates and the percent of time usages allocated to the process associated with the rates. These are presented in the tool matrix 60 in columns 42A, 42B, and 42C. In the preferred embodiment these process state efficiencies are computed by multiplying the percent of time usage for a given tool state for a respective process as given in columns 36A, 36B, and 36C with its associated rate as given in the respective column 40A, 40B, and 40C.

In many cases this will yield a process state efficiency of zero, as depicted in FIG. 2. Most of the time this will be because the rate for a given combination of process and associated tool state is zero, because the process is not capable in that tool state. However, at other times the process state efficiency will be equal to the percent of time usage because the rate is one hundred percent. For yet other combinations of tool state and process the process state efficiency will be something between zero percent and one hundred percent.

Preferably, some of the calculations as described herein, for example the process state efficiencies and others of the calculations as described below, are computed using the relevant data by a server 62. However, as mentioned above, the functionality of the sever 62 may be combined with one or more of the other functional elements that provide computational functions, rather than being physically housed in a separate processing device.

The next step given in the example depicted in the method of FIG. 4 is to calculate preliminary state efficiencies as given in block 88, or in other words to determine preliminary state efficiencies from the process state efficiencies associated with the different tool states. The preliminary state efficiencies are given in column 44 of the second portion 10B of the tool matrix 60 as depicted in FIG. 2. The preliminary state efficiencies are preferably computed by adding all of the process state efficiencies in columns 42A, 42B, and 42C for a given tool state. The preliminary state efficiencies represent the overall efficiency of the multi-component tool 52 when it is in a given tool state, taking into account all of the processes that are scheduled to be accomplished in the multi-component tool 52. The preliminary state efficiencies may be stored, for example, in a tool data base 54, such as an equipment integration data base.

The next step given in the example depicted in the method of FIG. 4 is to check the state time conditions, as given in block 90, or in other words to determine percent of time conditions for the different tool states, where the percent of time conditions represent ratios of time that the multi-component tool 52 exhibits the associated tool state. The percent of time condition for a given tool state is that amount of time that the multi-component tool 52 is in that tool state, preferably as expressed as a ratio of all time, or in other words, as a percent of time that the multi-component tool 52 is in the tool state. As described above, this information can be computed by the tool server 56, for example, as it updates the state data base 58 with state information from the multi-component tool 52.

It is likely that the multi-component tool 52 may never be in some of the tool states for any length of time whatsoever. Further, it is desired that the multi-component tool 52 be in one specific tool state, that tool state in which all of the discrete elements are functional, for as much time as possible. Thus, the percent of time conditions preferably tend to function as a weighting factor for the various preliminary state efficiencies that were previously computed.

It is also appreciated that the percent of time conditions will probably vary with time. For example, as the multi-component tool 52 enters a new tool state, and resides within that tool state for a given period of time, then the percent of time condition for that associated tool state changes, as does the percent of time conditions for the other tool states. Further, the percent of time conditions are also somewhat dependent upon the time frame within which the tool state data is collected. For example, in one embodiment tool state data is retained indefinitely, and none of the historical tool state data is discarded when updating the percent of time conditions. However, this may tend to make newer trends appear to be unduly miniscule in severity.

Thus, in the preferred embodiment there is a shorter time frame, after which historical tool state data is ignored for at least some of the percent of time condition calculations. In this manner, a more recent and perhaps more relevant basis for the percent of time conditions exists. Thus, problematic conditions that existed and were solved in the past do not need to impact a current time study for the determination of the percent of time conditions. Alternately, a long period of optimal operation of the multi-component tool 52 will similarly tend to not reduce the dramatic nature of a newly onset and catastrophic condition. Thus, the time frame used for the percent of time condition calculations may be set according to a balance of these and other criteria.

The next step given in the example depicted in the method of FIG. 4 is to calculate final state efficiencies as given in block 92, which are preferably determined for the different tool states from the percent of time conditions and the preliminary state efficiencies associated with the different tool states. In the preferred embodiment this is done by multiplying the percent of time condition by the preliminary state efficiency for each of the tool states. Thus, there will be one final state efficiency for each tool state. However, as mentioned above, there may be reasons why this calculation need not be made separately for each any every one of the various tool states.

The final step of the method is to determine the up time from the final state efficiencies, as given in block 94 of FIG. 4. This is preferably accomplished by adding together the final state efficiencies for the tool states, as were determined in block 92 and described above. Thus, this final step produces an up time that takes into account the fact that multiple processes are to be accomplished within the multi-component tool 52, and that the multi-component tool 52 is comprised of multiple discrete elements. This method also takes into account the possibility that some processes can still be run even when some of the elements of the multi-component tool 52 are not functional. Thus, use of this value for up time as described above will more fully enable the determination of a real world up time for the multi-component tool 52. In one embodiment the final state efficiencies and the up time are determined anew each time that the percent of time conditions change, which may be either or both of each time that the multi-component tool 52 enters a new tool state, or each time that the length of time that the multi-component tool 52 has been in the current tool state is updated.

Thus, those who use an up time determination as a basis for purchasing equipment needed for production will be able to more accurately predict the number of such multi-component tools 52 that are needed to achieve the production goals of the facility. Further, this up time calculation also tends to provide a more realistic basis for the determination of whether the multi-component tool 52 is meeting the up time guaranteed by a vendor.

Additionally, this up time calculation, which is preferably expressed as a percent, can be used to determine how effectively the multi-component tool 52 is being used. For example, if it is known from the method described above that the up time for the multi-component tool 52 is 78%, and further that the multi-component tool 52 is designed to produce 20 units per hour, based upon 100% up time, and if the multi-component tool 52 has been used for 168 hours, then the multi-component tool 52 should have produced 0.78×168×20 pieces during that time, or 2621 pieces. However, if the multi-component tool 52 only produced 2115 pieces, then it is known that the shortfall in the number of pieces produced is due to a reduced utilization of the multi-component tool 52, rather than to down time of the multi-component tool 52.

The utilization of the multi-component tool 52 is easily computed by dividing 2115 pieces actually produced by the 2621 pieces that could have been produced, which in this example yields about 81%. Thus, the multi-component tool 52 was, in this example, underutilized by almost 20%, or one day out of five. In other words, the multi-component tool 52 could have been used more, but was not for some reason. Thus, the reasons for this reduced utilization can be investigated and resolved, and the multi-component tool 52 put to more efficient use. In the past, investigations such as this were typically based more upon guesswork than upon fact, because the utilization and the up time tended to be confounded.

It is appreciated that the method as described herein and depicted in FIG. 4 may be accomplished with a system as also described herein and depicted in FIG. 3. Further, this method may also be embodied in a program that runs on a computer system having processing capability and access to the information described herein, regardless of whether that information may be directly and automatically gathered from the multi-component tool 52 itself and other primary sources, or whether that information is entirely input such as by hand.

For example, such a program could be run on a computer system such as a personal computer, having, for example, standard inputs and outputs such as a keyboard, a mouse, a monitor, a printer, and network connections. All of the input described above could in one embodiment be accomplished via the keyboard and the mouse. Alternately, all of the input described above could be accomplished via the network connection by directly polling and requesting the information from the other elements of the system as located on the network. Reports, such as a print out of the tool matrix 60 and other information, such as the time frame used as the basis for the calculations, and other relevant information in regard to the multi-component tool 52, can be presented from a reporting device 66, as depicted in FIG. 3, which may be, for example, a printer or a display screen.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A method for determining an up time of a multi-component tool having discrete elements based upon different processes that are to be accomplished in the multi-component tool, comprising the steps of:

identifying the discrete elements of the multi-component tool, identifying the different processes to be accomplished in the multi-component tool, determining different tool states of the multi-component tool by;

setting element states for each of the discrete elements of the multi-component tool, where a first possible element state indicates that the discrete element is functional, and a second possible element state indicates that the discrete element is nonfumctional, and identifying possible combinations of the element states of the discrete elements as the different tool states of the multi-component tool, determining which of the different processes can be accomplished in the different tool states, determining a percent of time usage of the multi-component tool that is allocated to each of the different processes, determining rates associated with combinations of the different tool states with the different processes, determining process state efficiencies from the rates and the percent of time usages allocated to the rates' associated process, determining a preliminary state efficiency for the different tool states from the process state efficiencies associated with the different tool states, determining percent of time conditions for the different tool states, where the percent of time conditions represent ratios of time that the multi-component tool exhibits the associated tool state, determining final state efficiencies for the different tool states from the percent of time conditions and the preliminary state efficiencies associated with the different tool states, and determining the up time from the final state efficiencies.

2. The method of claim 1, wherein the step of determining different tool states of the multi-component tool further comprises determining all of the possible different tool states of the multi-component tool.

3. The method of claim 1, wherein the step of determining rates associated with combinations of the different tool states with the different processes further comprises determining the rates as a percentage of a theoretical maximum rate.

4. The method of claim 1, wherein the step of determining rates associated with combinations of the different tool states with the different processes further comprises setting the rate to zero when the process associated with the tool state cannot be accomplished in the associated tool state.

5. The method of claim 1, wherein the step of determining rates associated with combinations of the different tool states with the different processes further comprises setting the rate to a reduced value when elements that can selectively be used by the associated process, but which are not critical to accomplishing the associated process, such as less than all of a set of redundant elements that can function in a parallel mode, are not available.

6. The method of claim 1, wherein the step of determining process state efficiencies from the rates and the percent of time usages allocated to the rates' associated process further comprises multiplying the rates by the percent of time usages.

7. The method of claim 1, wherein the step of determining a preliminary state efficiency for the different tool states from the process state efficiencies associated with the different tool states further comprises summing the process state efficiencies for a given tool state.

8. The method of claim 1, wherein the step of determining final state efficiencies for the different tool states from the percent of time conditions and the preliminary state efficiencies associated with the different tool states further comprises multiplying the percent of time conditions by the preliminary state efficiencies.

9. The method of claim 1, wherein the step of determining the up time from the final state efficiencies further comprises summing the final state efficiencies.

10. The method of claim 1, wherein the step of determining percent of time conditions for the different tool states further comprises real time monitoring of the multi-component tool and updating the percent of time conditions whenever the multi-component tool enters one of the different tool states.

11. The method of claim 1, wherein the final state efficiencies and the up time are determined anew whenever the multi-component tool enters one of the different tool states.

12. A program on a computer readable media, the program comprising computer executable instruction statements operable to instruct the computer to determine an up time of a multi-component tool having discrete elements based upon different processes that are to be accomplished in the multi-component tool, the computer executable instruction statements operable to:

prompt for and receive as input the discrete elements of the multi-component tool, prompt for and receive as input the different processes to be accomplished in the multi-component tool, formulate different tool states of the multi-component tool by;

setting element states for each of the discrete elements of the multi-component tool, where a first possible element state indicates that the discrete element is functional, and a second possible element, state indicates that the discrete element is nonfunctional, and calculating possible combinations of the element states of the discrete elements as the different tool states of the multi-component tool, prompt for and receive as input which of the different processes can be accomplished in the different tool states, prompt for and receive as input a percent of time usage of the multi-component tool that is allocated to each of the different processes, prompt for and receive as input rates associated with combinations of the different tool states with the different processes, calculate process state efficiencies from the rates and the percent of time usages allocated to the rates' associated process, calculate a preliminary state efficiency for the different tool states from the process state efficiencies associated with the different tool states, calculate percent of time conditions for the different tool states, where the percent of time conditions represent ratios of time that the multi-component tool exhibits the associated tool state, calculate final state efficiencies for the different tool states from the percent of time conditions and the preliminary state efficiencies associated with the different tool states, and calculate the up time from the final state efficiencies.

13. A computerized system to determine an up time of a multi-component tool having discrete elements based upon different processes that are to be accomplished in the multi-component tool, the computerized system comprising:

an output for requesting information, an input for receiving information, a display for presenting information, and a processor for executing instruction statements, the instruction statements operable to;

request at the output and receive at the input the discrete elements of the multi-component tool, request at the output and receive at the input the different processes to be accomplished in the multi-component tool, formulate different tool states of the multi-component tool by;

setting element states for each of the discrete elements of the multi-component tool, where a first possible element state indicates that the discrete element is functional, and a second possible element state indicates that the discrete element is nonfunctional, and calculating possible combinations of the element states of the discrete elements as the different tool states of the multi-component tool, request at the output and receive at the input which of the different processes can be accomplished in the different tool states, request at the output and receive at the input a percent of time usage of the multi-component tool that is allocated to each of the different processes, request at the output and receive at the input rates associated with combinations of the different tool states with the different processes, calculate process state efficiencies from the rates and the percent of time usages allocated to the rates' associated process, calculate a preliminary state efficiency for the different tool states from the process state efficiencies associated with the different tool states, calculate percent of time conditions for the different tool states, where the percent of time conditions represent ratios of time that the multi-component tool exhibits the associated tool state, calculate final state efficiencies for the different tool states from the percent of time conditions and the preliminary state efficiencies associated with the different tool states, and calculate the up time from the final state efficiencies.

14. The computerized system of claim 13, wherein the output, input, display, and processor are all part of a personal computer.

15. The computerized system of claim 13, wherein the input and output are connected to a computer network.

16. The computerized system of claim 3, wherein information requested at the output is selectively requested via a computer network and received at the input at least in part via the computer network.

17. The computerized system of claim 13, wherein the information requested at the output is selectively prompted for via the display.

18. The computerized system of claim 13, wherein the input further comprises a keyboard and a mouse.

19. The computerized system of claim 13, wherein the input and the output are in communication with the multi-component tool via a computer network.

20. The computerized system of claim 13, wherein the input and the output are in communication with the multi-component tool via a computer network, the processor periodically polls the multi-component tool to determine which of the different tool states the multi-component tool is in, and the processor selectively recalculates the percent of time conditions, the final state efficiencies, and the up time for the multi-component tool whenever the multi-component tool enters a different one of the tool states.

* * * * *